US008843326B1

(12) United States Patent
Lee

(10) Patent No.: US 8,843,326 B1
(45) Date of Patent: Sep. 23, 2014

(54) SYSTEM, METHOD AND COMPUTER-READABLE STORAGE MEDIUM FOR DEFINING A LOAD ENVELOPE THAT ENVELOPES A PLURALITY OF LOAD CASES

(75) Inventor: Ike S. Lee, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 350 days.

(21) Appl. No.: 13/189,002

(22) Filed: Jul. 22, 2011

(51) Int. Cl.
*G01L 1/00* (2006.01)
*G06F 17/50* (2006.01)

(52) U.S. Cl.
USPC ................................................ 702/42; 703/1

(58) Field of Classification Search
USPC ......... 702/42, 41, 43, 81, 84, 94–95, 97, 127, 702/150–153, 155–158, 166–167, 170; 703/1–2
See application file for complete search history.

(56) References Cited

U.S. PATENT DOCUMENTS

| 5,777,236 | A | 7/1998 | Walls |
| 5,841,040 | A | 11/1998 | Walls |
| 6,711,477 | B1* | 3/2004 | Johnson et al. ................ 701/3 |
| 6,799,463 | B2 | 10/2004 | Fields et al. |
| 6,813,749 | B2 | 11/2004 | Rassaian |
| 6,862,539 | B2 | 3/2005 | Fields et al. |
| 8,643,488 | B2 | 2/2014 | Lindgren |
| 2003/0088373 | A1 | 5/2003 | Fields et al. |
| 2003/0154451 | A1 | 8/2003 | Rassaian |
| 2003/0158676 | A1 | 8/2003 | Fields et al. |
| 2007/0100565 | A1 | 5/2007 | Gosse et al. |
| 2009/0189784 | A1 | 7/2009 | Lindgren |
| 2013/0231898 | A1 | 9/2013 | Oliverius et al. |

\* cited by examiner

*Primary Examiner* — Toan Le
(74) *Attorney, Agent, or Firm* — Alston & Bird LLP

(57) ABSTRACT

A method, apparatus and computer-readable storage medium are provided for defining a load envelope, such as a three-dimensional load envelope, that envelopes a plurality of load cases. In the context of a system, the system includes a coordinate system redefinition module configured to define three mutually orthogonal axes in a space representative of at least three load components and a surface facet definition module configured to identify load cases on a surface of the load envelope and to define a plurality of surface facets, such as surface triangles, that collectively define the load envelope. Each surface facet includes a plurality of vertices that are formed by load cases identified to be on the surface of the load envelope.

20 Claims, 14 Drawing Sheets

SYSTEM, METHOD AND COMPUTER-READABLE STORAGE MEDIUM FOR DEFINING A LOAD ENVELOPE THAT ENVELOPES A PLURALITY OF LOAD CASES

TECHNOLOGICAL FIELD

Embodiments of the present disclosure relate generally to techniques for enveloping a plurality of load cases and, more particularly, to techniques for defining a three-dimensional load envelope that envelopes a plurality of load cases.

BACKGROUND

During the design and analysis of a plurality of different types of structures, such as aircraft and other vehicles, buildings and the like, the impact of various load cases upon the structures may be analyzed. In this regard, the plurality of different load cases may be analyzed in order to ensure that the structure has been designed and/or constructed so as to withstand each of the load cases.

A load case may include a plurality of load components, such as axial loads, shear loads, bending moments, axial compression, torsion, temperature or the like. In instances in which a structure depends upon only one of these load components, the structural analysis may consist simply of considering the maximum and minimum values of the respective load component and then ensuring that the structure is sized so as to withstand such a load. However, more complex structures are generally analyzed in accordance with a plurality of load cases, each of which may include one or more load components. Thus, the analysis of the load cases may quickly become substantial with some structures requiring the analysis of hundreds or thousands of load cases. In this regard, the structural analysis of hundreds or thousand of load cases may not only be time-consuming, but may become unfeasible in some complex situations.

In some instances, analysts have relied upon intuition in order to reduce the number of load cases that must be considered. However, such a reduction in the number of load cases may compromise the accuracy of the results. As such, various techniques have been developed in order to analyze a plurality of load cases. For example, the max-max combination technique may consider the maximum values for each of the load components from among the plurality of load cases. While the max-max combination technique significantly reduces the time and the computing resources required for the analysis, the max-max combination may be too conservative in some situations, thereby potentially resulting in unnecessary increases in the weight of a structure and the cost of the materials that are incorporated into a structure. Additionally, reliance upon the max-max combination technique may result in the loss of information regarding the specific load cases. As another example of load case analysis, a single component survey may be performed. However, a single component survey may also be less than ideal and may result in other components being designed in a manner that is insufficient in some instances.

BRIEF SUMMARY

A method, apparatus and computer-readable storage medium are therefore provided for defining a load envelope, such as a three-dimensional load envelope, that envelopes a plurality of load cases in an efficient and accurate manner. By analyzing the response of the structure to the load cases on the load envelope, the structure may be appropriately sized and designed so as to accommodate these critical load cases in an efficient manner. As such, the method, apparatus and computer-readable storage medium of one embodiment provide for the conservation of computing resources and the identification and subsequent analysis of the critical load cases in both an efficient and accurate manner.

In one embodiment, a system is provided for defining a load envelope that envelopes a plurality of load cases. The system includes a coordinate system redefinition module configured to define three mutually orthogonal axes in a space representative of at least three load components and a surface facet definition module configured to identify load cases on a surface of the load envelope and to define a plurality of surface facets, such as surface triangles, that collectively define the load envelope. Each surface facet includes a plurality of vertices that are formed by load cases identified to be on the surface of the load envelope.

The system of one embodiment also includes a point elimination module configured to identify one or more load cases within an interior of the load envelope. The point elimination module may also be configured to eliminate the one or more load cases within the interior of the load envelope from consideration prior to identifying load cases on the surface of the load envelope and defining the plurality of surface facets. In one embodiment, the system also includes a normalization module configured to separately normalize data representative of the load components prior to identifying load cases on the surface of the load envelope and defining the plurality of surface facets.

The coordinate system redefinition module of one embodiment in which each load case defines a point in the space may be configured to define the three mutually orthogonal axes by identifying maximum and minimum values of the points in each of x, y and z directions, to identify the points having the maximum and minimum values that are separated by a greatest distance and to establish a first axis extending between points having the maximum and minimum values that are separated by the greatest distance. In this embodiment, the coordinate system redefinition module may also be configured to identify a point that is separated from the first axis by a greatest distance as measured along a line extending through the point and perpendicular to the first axis, to establish a second axis along the line extending through the point that is identified as being separated from the first axis by the greatest distance and to establish a third axis based upon a cross product of the first and second axes.

In one embodiment, the surface facet definition module is configured to define a plurality of surface triangles by identifying a point that is furthest from a center of maximum and minimum values in each of the first, second and third axes as a first vertex of a first triangle and identifying a point for which a vector between the first vertex and the point defines a largest angle relative to a vector between the center and the first vertex as a second vertex of the first triangle. The surface facet definition module of this embodiment may also be configured to identify a point for which a line extending through the point and perpendicular to a line between the first and second vertices defines a smallest angle relative to a line parallel to a line extending through the center and perpendicular to the line between the first and second vertices as a third vertex of the first triangle. The surface facet definition module may also be configured to define a second triangle including one side of the first triangle prior to repeatedly defining additional triangles including one side of a preceding triangle.

In another embodiment, a method is provided for defining a load envelope that envelopes a plurality of load cases. The method includes defining three mutually orthogonal axes in a space representative of at least three load components; identifying load cases on a surface of the load envelope; and defining, with a processor, a plurality of surface facets, such as surface triangles, that collectively define the load envelope. Each surface facet includes a plurality of vertices that are formed by load cases identified to be on the surface of the load envelope.

The method of one embodiment also identifies one or more load cases within an interior of the load envelope. The method of this embodiment also eliminates the one or more load cases within the interior of the load envelope from consideration prior to identifying load cases on the surface of the load envelope and defining the plurality of surface facets. In one embodiment, the method also includes separately normalizing data representative of the load components prior to identifying load cases on the surface of the load envelope and defining the plurality of surface facets.

A method of one embodiment in which each load case defines a point in the space defines the three mutually orthogonal axes by identifying maximum and minimum values of the points in each of x, y and z directions, identifying the points having the maximum and minimum values that are separated by a greatest distance and establishing a first axis extending between points having the maximum and minimum values that are separated by the greatest distance. In this embodiment, a method may also define the three mutually orthogonal axes by identifying a point that is separated from the first axis by a greatest distance as measured along a line extending through the point and perpendicular to the first axis, establishing a second axis along the line extending through the point that is identified as being separated from the first axis by the greatest distance and establishing a third axis based upon a cross product of the first and second axes.

In one embodiment, a method defines a plurality of surface triangles by identifying a point that is furthest from a center of maximum and minimum values in each of the first, second and third axes as a first vertex of a first triangle and identifying a point for which a vector between the first vertex and the point defines a largest angle relative to a vector between the center and the first vertex as a second vertex of the first triangle. The method of this embodiment may also define the plurality of surface triangles by identifying a point for which a line extending through the point and perpendicular to a line between the first and second vertices defines a smallest angle relative to a line parallel to a line extending through the center and perpendicular to the line between the first and second vertices as a third vertex of the first triangle. The method may then define a second triangle including one side of the first triangle prior to repeatedly defining additional triangles including one side of a preceding triangle.

In a further embodiment, a computer-readable storage medium is provided for monitoring health of a platform with the computer-readable storage medium having computer-readable program code portions stored therein that in response to execution by a processor cause an apparatus to define three mutually orthogonal axes in a space representative of at least three load components, to identify load cases on a surface of the load envelope and to define a plurality of surface facets, such as surface triangles, that collectively define the load envelope. Each surface facet may include a plurality of vertices comprised of load cases identified to be on the surface of the load envelope.

The computer-readable program code portions may be further configured, in response to execution by the processor, to cause the apparatus to identify one or more load cases within an interior of the load envelope and to eliminate the one or more load cases within the interior of the load envelope from consideration prior to identifying load cases on the surface of the load envelope and defining the plurality of surface facets. The computer-readable program code portions of one embodiment may be further configured, in response to execution by the processor, to cause the apparatus to separately normalize data representative of the load components prior to identifying load cases on the surface of the load envelope and defining the plurality of surface facets.

In an instance in which each load case defines a point in the space, the computer-readable program code portions may be configured, in response to execution by the processor, to cause the apparatus to define the three mutually orthogonal axes by identifying maximum and minimum values of the points in each of x, y and z directions, identifying the points having the maximum and minimum values that are separated by a greatest distance and establishing a first axis extending between points having the maximum and minimum values that are separated by the greatest distance. The computer-readable program code portions of this embodiment may also be configured, in response to execution by the processor, to cause the apparatus to identify a point that is separated from the first axis by a greatest distance as measured along a line extending through the point and perpendicular to the first axis, to establishing a second axis along the line extending through the point that is identified as being separated from the first axis by the greatest distance and to establish a third axis based upon a cross product of the first and second axes.

The computer-readable program code portions of one embodiment may also be configured, in response to execution by the processor, to cause the apparatus to define the plurality of surface triangles by identifying a point that is furthest from a center of maximum and minimum values in each of the first, second and third axes as a first vertex of a first triangle and identifying a point for which a vector between the first vertex and the point defines a largest angle relative to a vector between the center and the first vertex as a second vertex of the first triangle. The computer-readable program code portions of this embodiment may also be configured, in response to execution by the processor, to cause the apparatus to define the plurality of surface triangles by identifying a point for which a line extending through the point and perpendicular to a line between the first and second vertices defines a smallest angle relative to a line parallel to a line extending through the center and perpendicular to the line between the first and second vertices as a third vertex of the first triangle. Thereafter, the computer-readable program code portions of this embodiment may be configured, in response to execution by the processor, to define a second triangle including one side of the first triangle.

In accordance with embodiments of the present disclosure, systems, methods and computer program products are provided in order to efficiently and accurately define a load envelope, such as a three dimensional load envelope, that envelopes a plurality of load cases. However, the features, functions and advantages that have been discussed may be achieved independently and the various embodiments of the present disclosure may be combined in other embodiments, further details of which may be seen with reference to the detailed description and drawings.

BRIEF DESCRIPTION OF THE DRAWINGS

Figure 1:
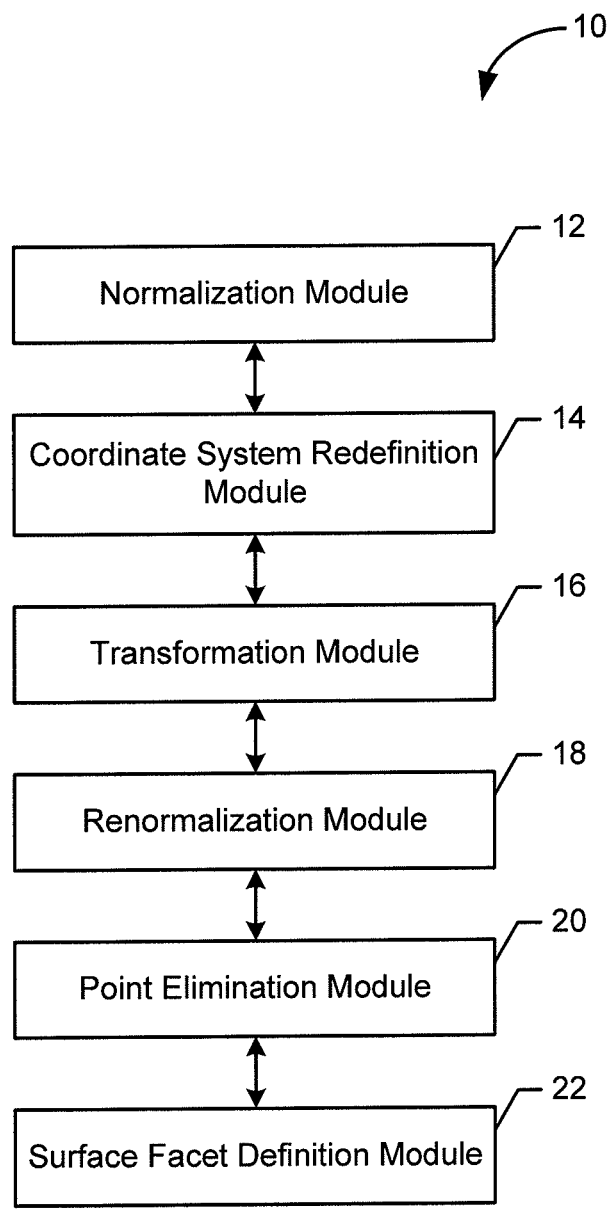
Figure 2:
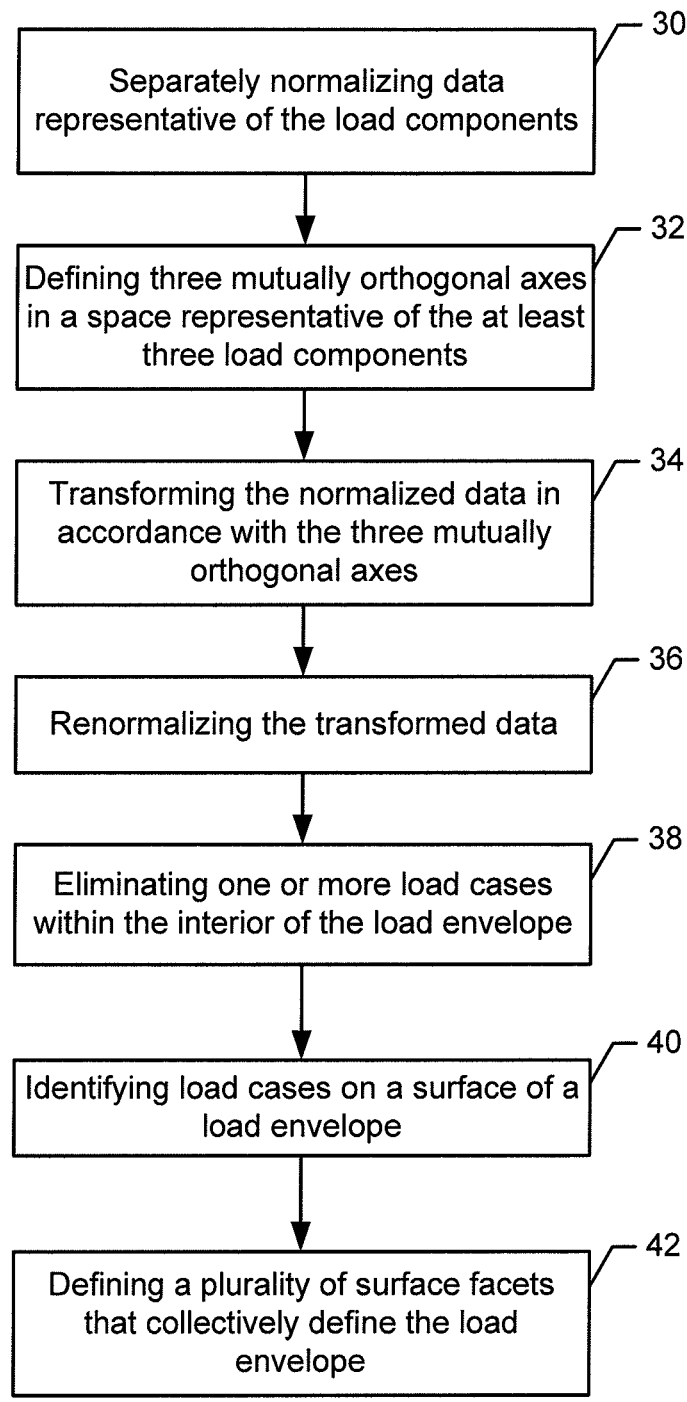
Figure 3:
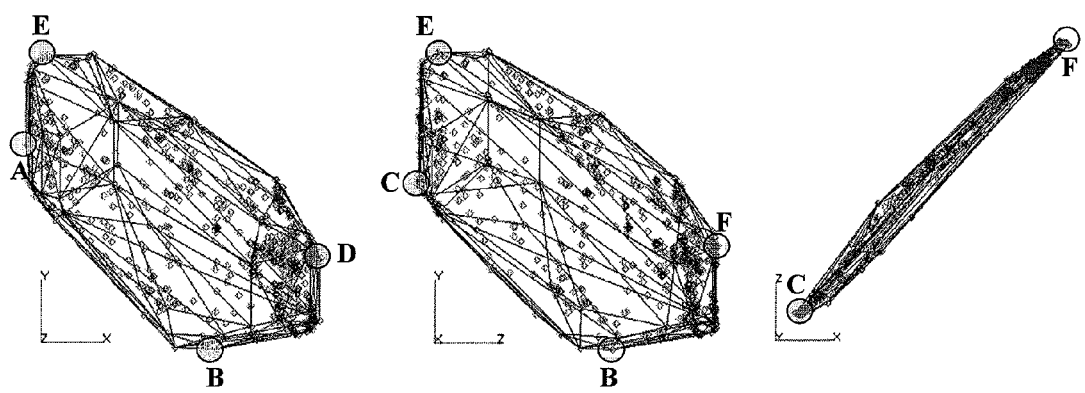
Figure 4:
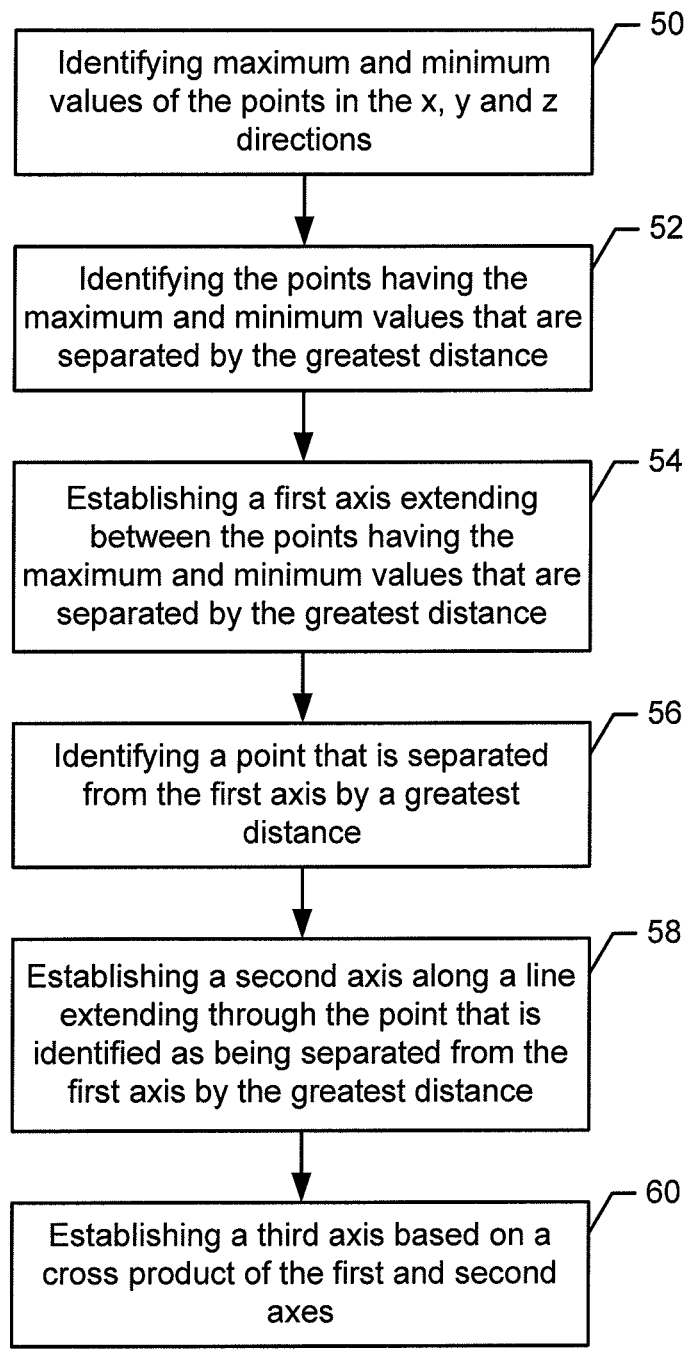
Figure 5:
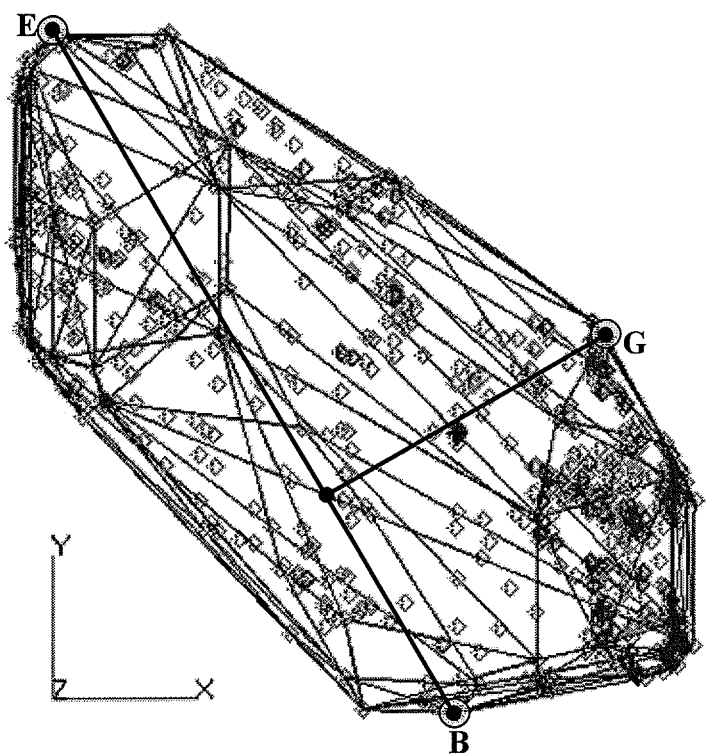
Figure 6:
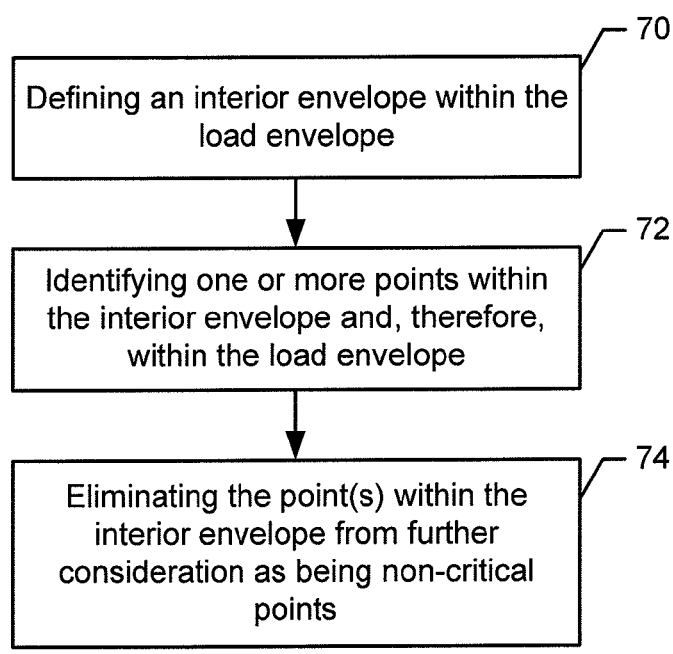
Figure 7:
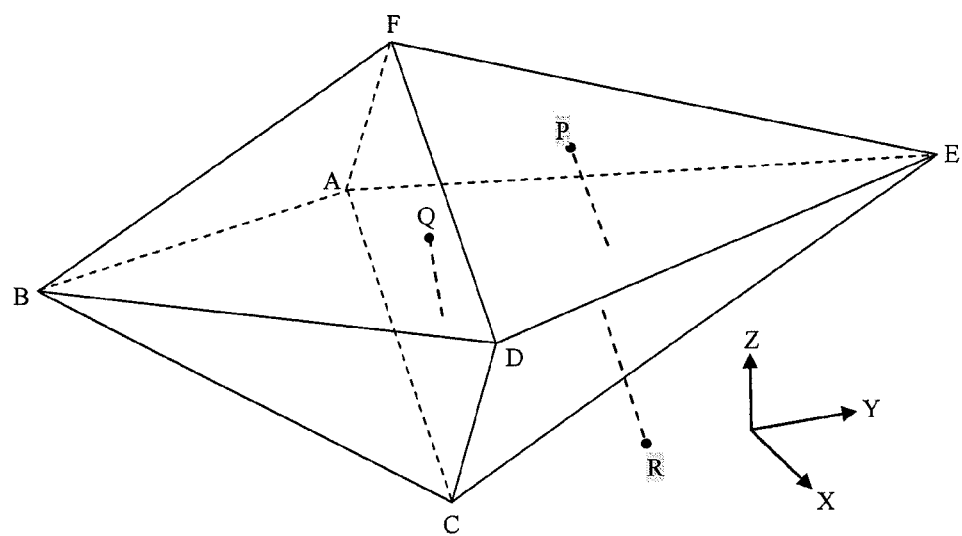
Figure 8:
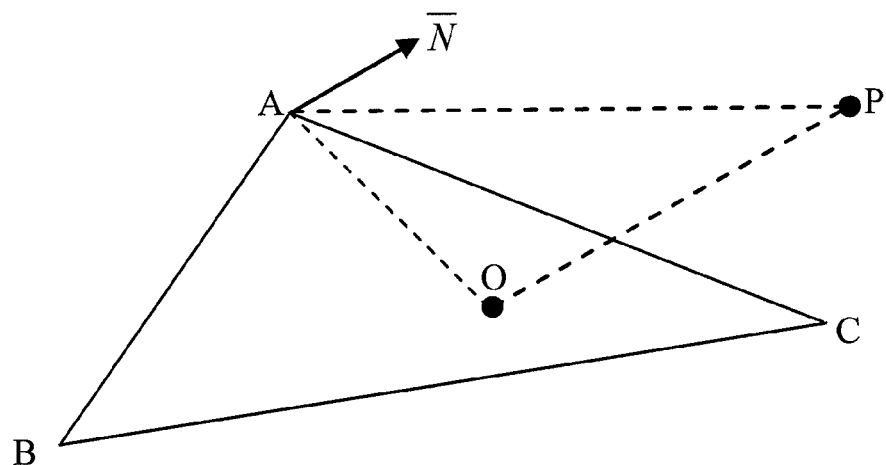
Figure 9:
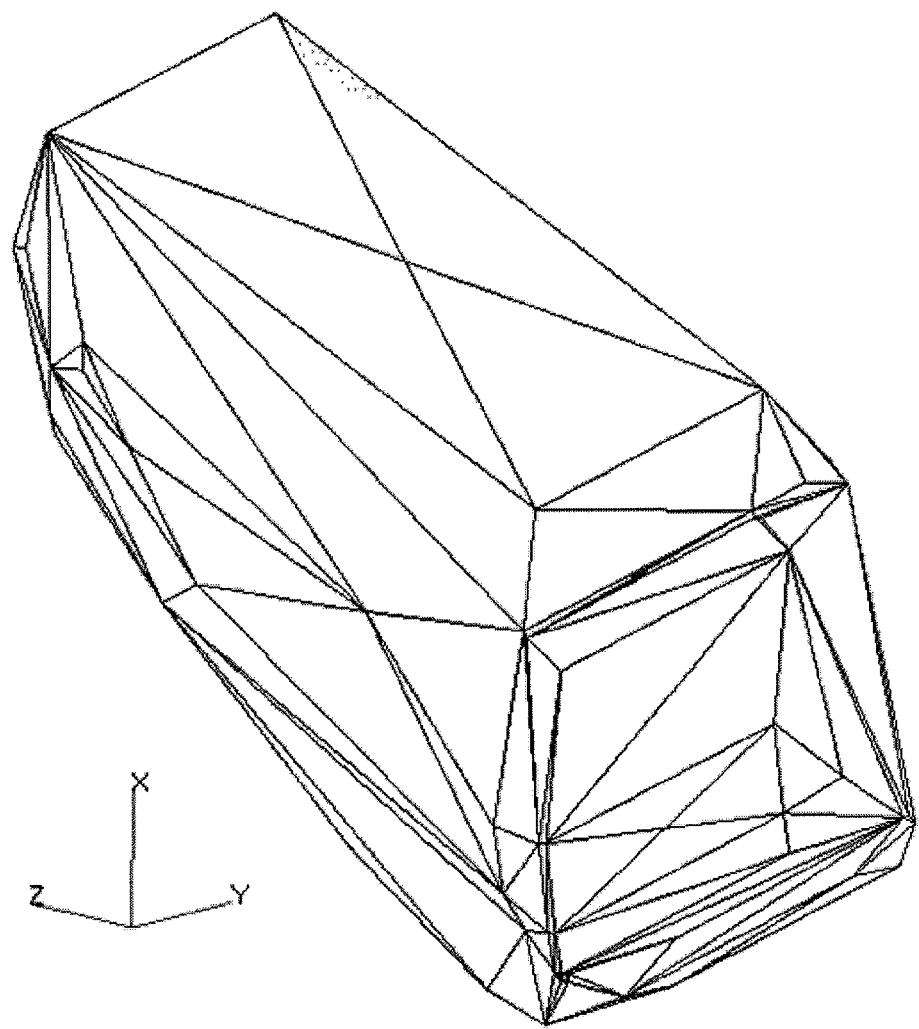
Figure 10:
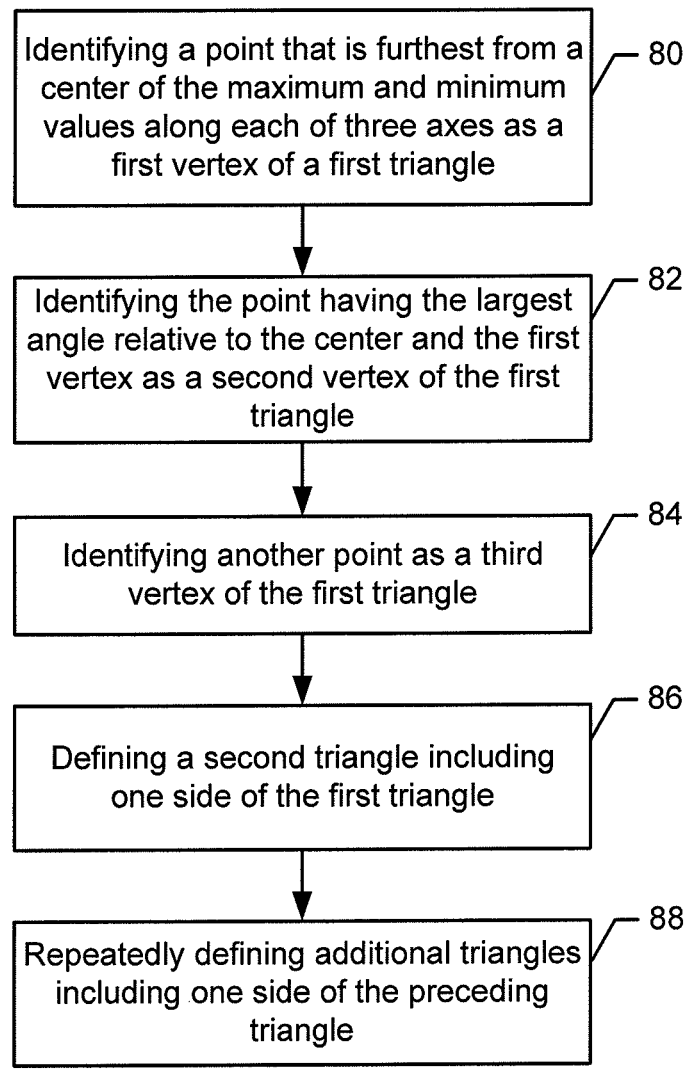
Figure 11:
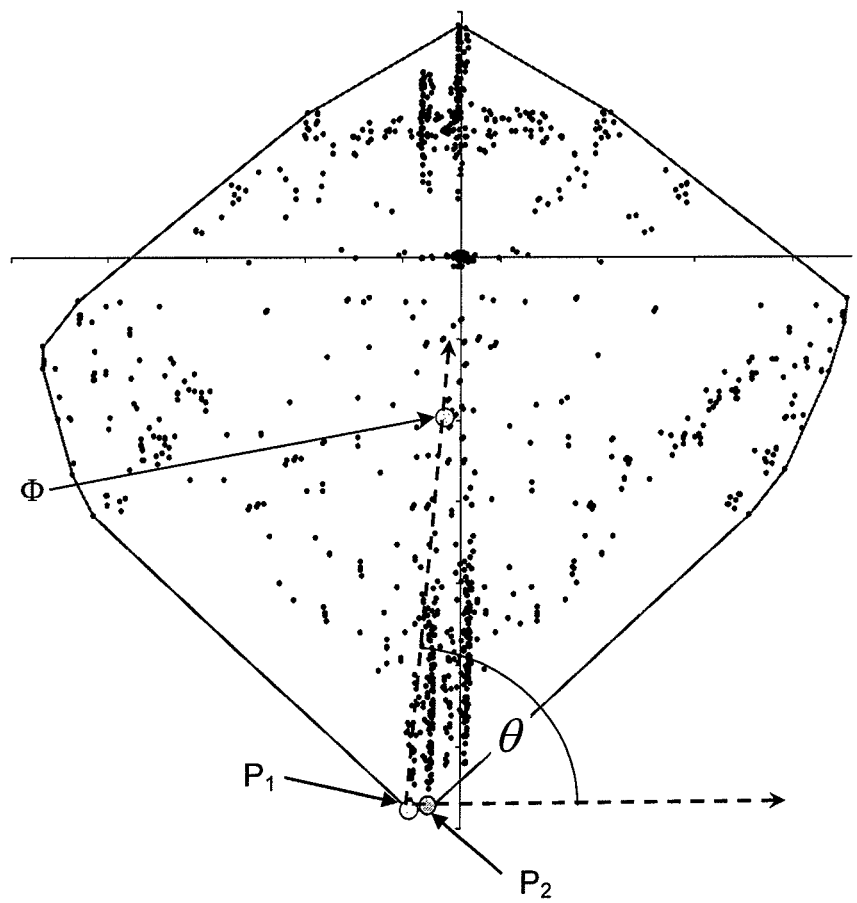
Figure 12:
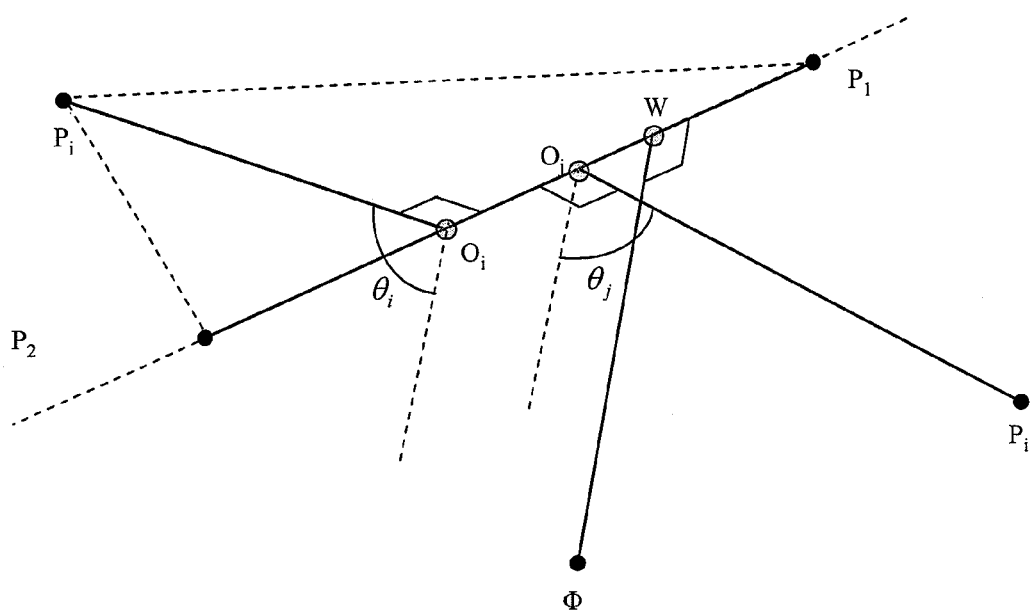
Figure 13:
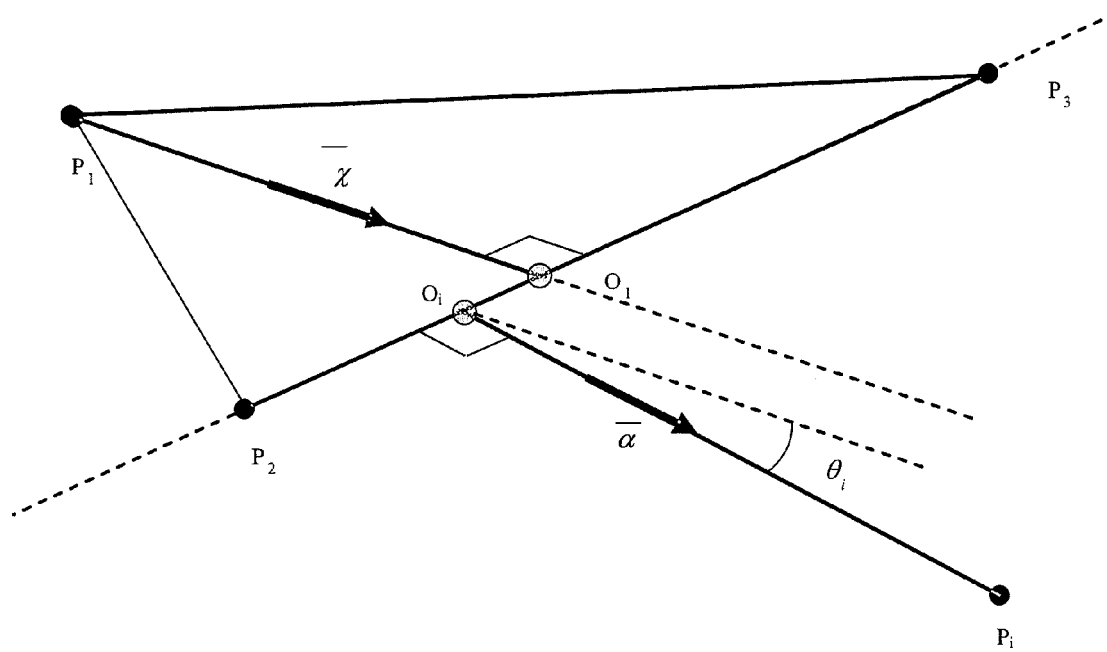
Figure 14:
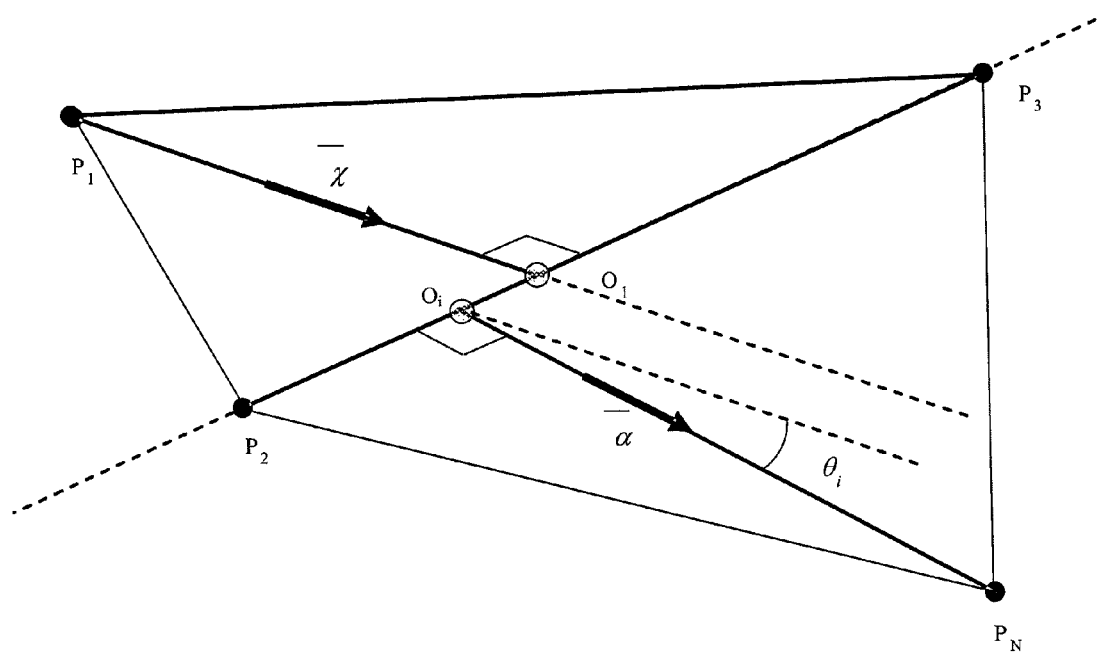

Having thus described the example embodiments of the present disclosure in general terms, reference will now be made to the accompanying drawings, which are not necessarily drawn to scale, and wherein:

FIG. 1 is a block diagram of a system configured to define a load envelope in accordance with one embodiment to the present disclosure;

FIG. 2 is a flow chart illustrating operations performed in order to define a load envelope in accordance with one embodiment to the present disclosure;

FIG. 3 provides a visual representation of a three-dimensional load envelope from three different perspectives;

FIG. 4 is a flow chart illustrating operations performed by a coordinate system redefinition module in accordance with one embodiment to the present disclosure;

FIG. 5 is a graphical representation of a three-dimensional load envelope illustrating the establishment of first and second axes in accordance with one embodiment of the present disclosure;

FIG. 6 is a flow chart illustrating operations performed by the point elimination module in accordance with one embodiment to the present disclosure;

FIG. 7 is a graphical representation of a double pyramid that may be constructed as an interior envelope within a three-dimensional load envelope in order to facilitate elimination of one or more load cases within the interior of the load envelope in accordance with one embodiment to the present disclosure;

FIG. 8 is a graphical representation of a plane projection point within plane ABC that has a minimum distance to point P as may be utilized in the elimination of one or more load cases within the interior of a three-dimensional load envelope in accordance with one embodiment to the present disclosure;

FIG. 9 is another graphical representation of a three-dimensional load envelope constructed in accordance with an embodiment of the present disclosure;

FIG. 10 is a flow chart illustrating operations performed by a surface facet definition module in accordance with one embodiment to the present disclosure;

FIG. 11 is a graphical representation of the identification of first and second vertices of a first triangle by a surface facet definition module in accordance with one embodiment to the present disclosure;

FIG. 12 is a graphical representation of the identification of a third vertex of the first triangle by the surface facet definition module in accordance with one embodiment to the present disclosure;

FIG. 13 is a graphical representation of the determination of a vertex of a second triangle proximate the first triangle by the surface facet definition module in accordance with one embodiment to the present disclosure; and FIG. 14 is a graphical representation of the definition of the second triangle that includes one side of the first triangle by the surface facet definition module in accordance with one embodiment to the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Example embodiments to the present disclosure provide a system, method and computer-readable storage medium for defining a load envelope, such as a three-dimensional envelope, that envelopes a plurality of load cases. As such, the method, apparatus and computer-readable storage medium may facilitate the structural analysis of a structure in response to a variety of load cases, each of which may include one or more load components, such as three or more independent load components. While axial loads, shear loads and bending moments are discussed hereinbelow as examples of the load components, the load cases may include a number of different and/or additional load components, such as axial compression, torsion, temperature, other types of loads or moments and the like. A wide variety of structures, such as vehicles, e.g., air vehicles, buildings and the like, may be analyzed in order to facilitate the design and/or construction of the structure so as to withstand the various anticipated loads cases or to analyze an existing structure to ensure that the structure can withstand the various load cases. Although shown as separate modules, it should be understood that the operations performed by more than one module may be integrated within and instead performed by a single module. It should also be understood that operations performed by one module may be separated and, instead, performed by more than one module.

A module may be embodied as various means for implementing the various functionalities of example embodiments of the present disclosure. A module may optionally include, for example, one or more processors, memory devices, Input/Output (I/O) interfaces, communications interfaces and/or user interfaces. The processor may include, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package.

Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be specifically configured to operate such that the processor causes the module to perform various functionalities described herein.

Whether configured as hardware alone or via instructions stored on a computer-readable storage medium, or by a combination thereof, the processor may be an apparatus embodying or otherwise configured to perform operations of a module according to embodiments of the present disclosure while accordingly configured. Thus, in example embodiments where the processor is embodied as, or is part of, an ASIC, FPGA, or the like, the module is specifically configured hardware for conducting the operations described herein. Alternatively, in example embodiments where the processor is embodied as an executor of instructions stored on a computer-readable storage medium, the instructions specifically configure the module to perform the algorithms and operations described herein.

The memory device of a module may be one or more non-transitory computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor of the module.

Further, the memory device of a module may be configured to store information, data, applications, computer-readable program code instructions, and/or the like for enabling the module to carry out various functions in accordance with example embodiments of the present disclosure described herein. For example, the memory device may be configured to buffer input data for processing by the processor of the module. Additionally, or alternatively, the memory device may be configured to store instructions for execution by the processor.

The I/O interface of a module may be any device, circuitry, or means embodied in hardware, software or a combination of hardware and software that is configured to interface the processor of the module with other circuitry or devices, such as the communications interface and/or the user interface of the module. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the module to perform, various functionalities of an example embodiment of the present disclosure.

The communication interface of a module may be any device or means embodied in hardware, software or a combination of hardware and software that is configured to receive and/or transmit data from/to one or more networks and/or any other device or module in communication with the respective module. The communications interface may be configured to provide for communications in accordance with any of a number of wired or wireless communication standards. The processor of the module may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. The module of one example may communicate via the communication interface with various other network elements in a device-to-device fashion and/or via indirect communications.

The user interface of a module may be in communication with the processor of the module to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device of the module). In some example embodiments, the user interface circuitry is configured to facilitate user control of at least some functions of the module through the use of a display and configured to respond to user inputs. The processor may also comprise, or be in communication with, display circuitry configured to display at least a portion of a user interface, the display and the display circuitry configured to facilitate user control of at least some functions of the module.

As noted above, a plurality of load cases to which a structure may be subjected and which are to be the subject of analysis may be provided. Each load case may include a plurality of load components, such as an axial load, a shear load and/or a bending moment, although the load cases may include other types of loads or moments in other embodiments. In order to facilitate the analysis of the load cases, the geometric locations of the load cases in a cartesian coordinate system having x, y and z axes representing three different load components, such as the axial loads, the shear loads and the bending moments, respectively, may be defined. In this example, $\{X\}$ may represent the array of axial loads for all load cases, $\{Y\}$ may represent the array of shear loads for all load cases and $\{Z\}$ may represent the array of bending moments for all load cases.

For at least some structures, each load component may have a different magnitude scale such that the tolerance precision for each load component is not uniform. As such, the load components may be normalized in order to bring each of the load components into a more uniform scale. As such, the system 10 may include a normalization module 12 which, as described above, may include a processor and/or memory device that are specifically configured in order to separately normalize the data, that is, the load components. See also operation 30 of FIG. 2. While the normalization module 12 may be configured to separately normalize the load components in various manners, the normalization module of one embodiment may normalize the load components as follows:

$$\{X_N\} = \frac{\{X\}}{\text{Span}_x} \quad \text{where } \text{Span}_x = \text{Max}\{X\} - \text{Min}\{X\}$$

$$\{Y_N\} = \frac{\{Y\}}{\text{Span}_Y} \quad \text{where } \text{Span}_Y = \text{Max}\{Y\} - \text{Min}\{Y\}$$

$$\{Z_N\} = \frac{\{Z\}}{\text{Span}_Z} \quad \text{where } \text{Span}_Z = \text{Max}\{Z\} - \text{Min}\{Z\}$$

wherein Max and Min represent the maximum and minimum values, respectively, of a respective load component. The resulting normalized load components $X_N$, $Y_N$ and $Z_N$ are therefore represented in the N coordinate system.

Following normalization, the plurality of load cases may, in some instances, still have a shape or form of a relatively flat plate or pancake when viewed from at least one perspective. In this regard, FIG. 3 is a graphical representation of a plurality of load cases, following normalization, from three different orthogonal perspectives as indicated by the reference axes associated with each plot. As shown in the right-most plot of FIG. 3, a relatively strong linear relationship exists in this example between the normalized axial loads $X_N$ and the normalized bending moments $Z_N$. As will be noted, near the edge of the relatively flat-shaped load envelope, there is a relatively sharp change in angle which may present challenges during the subsequent determination of the load envelope. Additionally, the relatively flat-shaped load envelope of this example may have a surface that is so flat that the definition of the corresponding envelope surface may become more difficult due to, for example, a loss of precision of the computing tolerance.

In order to avoid these issues attributable to a relatively flat shaped load envelope, the system 10 may include a coordinate system redefinition module 14 which may include a processor that is specifically configured to define, that is, redefine, three mutually orthogonal axes in the space representative of the three load components, e.g., axial loads, shear loads and bending moments. See also operation 32 of FIG. 2. As described below, the coordinate system redefinition module 14 may define the three mutually orthogonal axes, such that one axis, such as the $Z_J$ axis, may be normal to the relatively flat surface. By then re-normalizing the values along this newly defined $Z_J$-axis, a more ball-like shaped load envelope may be generated to facilitate subsequent determination of the load envelope and the critical load cases thereon.

While the graphical representation of the load cases of FIG. 3 depicts the relatively flat shaped load envelope in the X-Z plane, it may be that the normalized load cases may not reveal a relatively flat shaped load envelope when considered in the X-Y plane, the Y-Z plane or the X-Z plane even though the load cases may have a relatively flat geometric character when considered in another plane. As such, the coordinate system redefinition module 14 may define the three mutually orthogonal axes in a manner intended to identify a relatively flat shaped load envelope in any plane within the space. By way of example of the operations performed by the coordinate system redefinition module 14 of one embodiment, reference is now made to FIG. 4 in which each load case defines a point in space. As shown in FIG. 3 and in operation 50 of FIG. 4, the coordinate system redefinition module 14 may identify maximum and minimum values of the points along each of the original Cartesion coordinate axes, such as in the x, y and z directions. In the embodiment illustrated in FIG. 3, for example, A and D are the points at which the normalized X value is a minimum and maximum, respectively, points B and E are the points at which the normalized Y value is a minimum and maximum, respectively and points C and F are the points at which the normalized Z value is a minimum and maximum, respectively.

As shown in operation 52 of FIG. 4, the coordinate system redefinition module 14 of this embodiment may also be configured to identify the points having the maximum or minimum values that are separated by a greatest distance. Although the coordinate system redefinition module 14 may identify the points having the maximum or minimum values that are separated by the greatest distance in various manners, the coordinate system redefinition module of one embodiment may identify the points of interest in accordance with the following matrix:

$$\text{Max} \begin{bmatrix} Dist(A,A) & Dist(A,B) & Dist(A,C) & Dist(A,D) & Dist(A,E) & Dist(A,F) \\ Dist(B,A) & Dist(B,B) & Dist(B,C) & Dist(B,D) & \boxed{Dist(B,E)} & Dist(B,F) \\ Dist(C,A) & Dist(C,B) & Dist(C,C) & Dist(C,D) & Dist(C,E) & Dist(C,F) \\ Dist(D,A) & Dist(D,B) & Dist(D,C) & Dist(D,D) & Dist(D,E) & Dist(D,F) \\ Dist(E,A) & \boxed{Dist(E,B)} & Dist(E,C) & Dist(E,D) & Dist(E,E) & Dist(E,F) \\ Dist(F,A) & Dist(F,B) & Dist(F,C) & Dist(F,D) & Dist(F,E) & Dist(F,F) \end{bmatrix}$$

In regards to the above matrix, Dist(A,B) is a function that determines the distance between two points A,B and Max represents the identification of the maximum value from among the plurality of distances within the matrix. In this example, points B and E are separated by the greatest distance. As shown in operation 54 of FIG. 4, the coordinate system redefinition module 14 may therefore be configured to establish a first axis extending between the points having the maximum and minimum values that are separated by the greatest distance, such as points B and E in the illustrated embodiment, and as also depicted in FIG. 5.

Following the redefinition of the coordinate system, the new coordinate system may be referred to as the J coordinate system such that the first axis established by the coordinate system redefinition module 14 of this embodiment may be referred to as the $X_J$ axis which may have a directional cosine as follows:

$$\hat{X}_J = \frac{\overline{BE}}{\|\overline{BE}\|}$$

The coordinate system redefinition module 14 of one embodiment may then establish a second axis of the three mutually orthogonal axes. In this regard, the coordinate system redefinition module 14 may identify a point from among the plurality of load cases that is separated from the first axis, such as the $X_J$ axis, by the greatest distance. See operation 56 of FIG. 4. In this regard and as shown in FIG. 5, the distance may be measured along a line that extends through the point and is perpendicular to the first axis. In regards to the embodiment to FIG. 5, for example, point G may be identified as being separated from the first axis $\overline{BE}$ by the greatest distance. As shown in operation 58 of FIG. 4, the coordinate system redefinition module 14 may then establish a second axis, such as the $Y_J$ axis, along the line extending through the point, such as point G, that is identified as being separated from the first axis by the greatest distance.

The coordinate system redefinition module 14 may be configured to identify the point that is separated from the first axis by the greatest distance in various manners. In one embodiment, however, the shortest distance to the first axis, that is, the $\overline{BE}$ axis, from an arbitrary point G may be defined as follows:

$$\text{Distance} = \left\| \overline{BG} - \overline{BG} \cdot \frac{\overline{BE}}{\|\overline{BE}\|} \right\|$$

In this embodiment, the coordinate system redefinition module 14 may consider every point from the plurality of load cases to identify the point that is located the furthest away from the first axis, that is, the point for which the shortest distance to the first axis is the greatest. Once the point G that is located the furthest distance from the first axis is identified, the coordinate system redefinition module 14 may define the directional cosine at the new $Y_J$ axis, as follows:

$$\hat{Y}_J = \frac{\overline{BG} - \overline{BG} \cdot \frac{\overline{BE}}{\|\overline{BE}\|}}{\left\|\overline{BG} - \overline{BG} \cdot \frac{\overline{BE}}{\|\overline{BE}\|}\right\|}$$

The coordinate system redefinition module 14 of one embodiment may also be configured to establish a third axis based upon a cross product of the first and second axes, as shown in operation 60 of FIG. 4. In the foregoing example, $\hat{X}_J$ and $\hat{Y}_J$ are unit vectors and are orthogonal to one another such that the coordinate system redefinition module may define the new $\hat{Z}_J$ as a cross product of $\hat{X}_J$ and $\hat{Y}_J$.

The system 10 of one embodiment may also include a transformation module 16 which may include a processor that is specifically configured in order to transform, such as in accordance with a Jacobian transformation, the normalized load cases into the coordinate system now defined by the three mutually orthogononal axes $\hat{X}_J$, $\hat{Y}_J$ and $\hat{Z}_J$ identified by the coordinate system redefinition module 14. See also operation 34 of FIG. 2. In this regard, a transformation matrix $T_J$ may be defined as follows:

$$T_J = [\hat{X}_J \hat{Y}_J \hat{Z}_J]$$

such that the transformation module 16 of this embodiment may transform the normalized load cases as follows:

$$[\{X_J\}\{Y_J\}\{Z_J\}] = [\{X_N\}\{Y_N\}\{Z_N\}] \cdot T_J$$

such that $X_J$, $Y_J$ and $Z_J$ represent the normalized load components, such as the normalized axial load, shear loads, and bending moments, respectively, in accordance with the redefined coordinate system.

In one embodiment, the transformed data may again be re-normalized, albeit this time in accordance with the J coordinate system, as shown in operation 36 of FIG. 2. As such, the system 10 may include a renormalization module 18 which may include a processor and/or a memory device that are specifically configured in order to separately normalize the transformed data, e.g., the transformed load components, representative of the three load components, e.g., axial loads, shear loads and bending moments, following transformation. While the renormalization module 18 may be configured to separately renormalize the transformed data in various manners, the renormalization module of one embodiment may be configured to renormalize the transformed data as follows:

$$\{X_{JN}\} = \frac{\{X_J\}}{\text{Span}_x} \quad \text{where Span}_x = \text{Max}\{X_J\} - \text{Min}\{X_J\}$$

$$\{Y_{JN}\} = \frac{\{Y_J\}}{\text{Span}_Y} \quad \text{where Span}_Y = \text{Max}\{Y_J\} - \text{Min}\{Y_J\}$$

$$\{Z_{JN}\} = \frac{\{Z_J\}}{\text{Span}_Z} \quad \text{where Span}_Z = \text{Max}\{Z_J\} - \text{Min}\{Z_J\}$$

As noted above, the data following transformation and then renormalization is in the JN coordinate system and may be denoted as $X_{JN}$ and, $Y_{JN}$ and $Z_{JN}$ for the three load components, e.g., the axial loads, shear loads and bending moments, respectively. In some instances, the foregoing operations, such as the coordinate system redefinition, transformation and renormalization shown in operations 32, 34 and 36, may be repeated one or more times in an effort to improve the quality of the data. However, the repetition of these operations is optional, and these operations need not be repeated in some embodiments.

As described below, the definition of the surface facets that comprise the load envelope may be computationally intensive. In order to reduce the resulting computing time and to correspondingly increase the efficiency with which the load envelope is determined, load cases that are non-critical, that is, load cases that will not be on the surface of the load envelope, but would be within the interior of the load envelope, may be eliminated since these non-critical load cases will not impact the structural analysis and any resulting decisions relating to the sizing or design of the structure. See operation 38 of FIG. 2. As such, the system 10 of one embodiment may also include a point elimination module 20 which may include a processor that is specifically configured in order to identify one or more load cases within the interior of the resulting load envelope and to eliminate the one or more load cases within the interior of the load envelope from consideration prior to construction of the load envelope and its constituent surface facets.

The point elimination module 20 may be configured to identify the non-critical load cases and to eliminate the non-critical load cases in various manners. In one embodiment described in FIG. 6, however, the point elimination module 20 may create an interior envelope within the resulting load envelope. See operation 70 of FIG. 6. While an interior envelope may be created in various manners, the point elimination module 20 of one embodiment may define a double pyramid within the load envelope based upon the six points that were previously identified to have the maximum and minimum values in each of the x, y and z directions, that is, points A, B, C, D, E and F as described above in conjunction with FIG. 3. In this regard, the double pyramid of one embodiment is shown, for example, in FIG. 7. In this embodiment, any load cases or points within the double pyramid may be eliminated as being non-critical.

In order to facilitate the subsequent discussion of such non-critical points that may be eliminated, a function PPP (Plane Projection Point) may be defined. In this regard, a plane in space may be defined by three points, such as A, B and C. For any point in space, such as point P, there is a unique location O on the plane ABC that has a minimum distance to point P. As such, PPP(A,B,C,P) indicates a point on the plane ABC that has a minimum distance to point P. By way of example, FIG. 8 illustrates point O in plane ABC that has a minimum distance to point P.

Additionally, there is a reference point Q within the double pyramid that may be defined as follows:

$$Q = \left(\frac{D_x - A_x}{2}, \frac{E_y - B_y}{2}, \frac{F_z - C_z}{2}\right)$$

With reference to FIG. 7, a point P that is within the double pyramid and a point R that is outside the double pyramid will now be analyzed. In this regard, for a point P that resides within the double pyramid, Dot(Vector(PPP(A,E,C,Q),Q),Vector(PPP(A,E,C,P), P))

results in a positive value, while for a point R that resides outside the double pyramid, Dot(Vector(PPP(A,E,C,Q),Q),Vector(PPP(A,E,C,R), R))

results in a negative value. In the foregoing equations, Dot represents the dot product of two vectors.

Further, to determine if a point P resides within the interior of the double pyramid so as to therefore reside inside of all eight surfaces of the double pyramid, the point elimination module 20 of one embodiment may be configured to define the following function:

$$\text{In\_or\_Out}(A, E, C, Q, P) = \frac{\text{Dot}(\text{Vector}(PPP(A, E, C, Q), Q), \text{Vector}(PPP(A, E, C, P), P))}{|\text{Dot}(\text{Vector}(PPP(A, E, C, Q), Q), \text{Vector}(PPP(A, E, C, P), P))|}$$

As such, a point P will be considered to be inside the double pyramids and therefore non-critical if and only if the following condition is satisfied:

$$\sum_{i=1}^{8} \text{In\_or\_Out}(Vertex1(i), Vertex2(i), Vertex3(i), Q, P) = 8$$

Where

Vertex1($i$)=Array($A,A,A,A,D,D,D,D$)

Vertex2($i$)=Array($B,B,E,E,B,B,E,E$)

Vertex3($i$)=Array($C,F,C,F,C,F,C,F$)

As shown in operation 72 of FIG. 6, the point elimination module 20 of this embodiment may therefore consider each of the load cases and determine whether each load case is inside or outside of the interior envelope. For those load cases identified to be within the interior envelope and therefore interior of the resulting load envelope, the point elimination module 20 may also be configured to eliminate those interior points, as shown in operation 74 of FIG. 6. While the point elimination module 20 described above constructed an interior envelope and, more particularly, an interior envelope in the form of a double pyramid, the point elimination module may construct interior envelopes of other shapes and, indeed, may identify interior and, therefore, non-critical points in other manners in other embodiments.

The system 10 of one embodiment also includes a surface facet definition module 22 which may include a processor that is specifically configured to identify load cases on the surface of a load envelope and to identify a plurality of surface facets, such as a plurality of surface triangles, that collectively define the load envelope. See operations 40 and 42 of FIG. 2. In this regard, each surface facet includes a plurality of vertices defined by or comprised of load cases identified to be on the surface of the load envelope. While the load cases may define load envelopes of various shapes and sizes, the load envelope of one embodiment is shown in FIG. 9 and includes a plurality of surface triangles that collectively define the resulting load envelope. As will be noted, the surface triangles are connected to one another such that the resulting load envelope is a closed shape. The subsequent discussion regarding the definition of the load envelope will be generally set forth in accordance with the JN coordinate system, but the corresponding graphical representations, such as FIG. 9, will be presented in the N coordinate system so as to provide a physical sense of the load envelope.

As shown in the flow chart of FIG. 10, the surface facet definition module 22 may be configured to define a plurality of surface facets, such as the plurality of surface triangles, by initially constructing a first triangle and then sequentially defining additional triangles, each of which includes one side of the preceding triangle. In regard to the construction of the first triangle, the surface facet definition module 22 is configured to identify three critical points. In this regard, a point is considered to be critical in an instance in which the point is located on the surface of the resulting load envelope, as opposed to within the interior of the load envelope. In this regard and as shown in operation 80 of FIG. 10, the surface facet definition module 22 may be configured to identify a first point, such as a first vertex of a first triangle, by identifying the point that is furthest from the center of the maximum or minimum values along each of the first, second third axes in either the J or JN coordinate system. In this regard, the center of the maximum and minimum values in each of the first, second and third axes of a J coordinate system may defined as follows:

$$X_{REF} = \frac{\text{Max}\{X_J\} + \text{Min}\{X_J\}}{2}$$

$$Y_{REF} = \frac{\text{Max}\{Y_J\} + \text{Min}\{Y_J\}}{2}$$

$$Z_{REF} = \frac{\text{Max}\{Z_J\} + \text{Min}\{Z_J\}}{2}$$

The surface facet definition module 22 of this embodiment may then consider each point, that is, each point representative of a load case that has not yet been eliminated, such as by the point elimination module 20 so as to determine the distance $R_I$ from the point $P_I$ located at $(x_I, y_I, z_I)$ to the center as follows:

$$R_i = \sqrt{(x_i - X_{REF})^2 + (y_i - Y_{REF})^2 + (z_i - Z_{REF})^2}$$

The surface facet definition module 22 of this embodiment may therefore be configured to determine the point $P_I$ at which the distance $R_I$ is a maximum. This point $P_I$ is guaranteed to be on the surface of the load envelope and is identified by the surface facet definition 22 of this embodiment as being the first vertex of the first triangle, as shown in operation 80 of FIG. 10.

The surface facet definition module 22 of this embodiment may then identify the second vertex of the first triangle. In one embodiment, the surface facet definition module 22 may identify the second vertex by examining the position of all of the points relative to the vector between the center and the first vertex $P_1$. In this regard, the center may be designated as $\Phi$ and a vector $\overline{P_1\Phi}$ may be defined as a vector from the center $\Phi$ to the first vertex $P_1$. For an arbitrary point $P_i$, the surface facet definition module 22 may determine the angle between $\overline{P_1P_i}$ and $\overline{P_1\Phi}$ as follows:

$$\theta_i = \text{Angle}(\overline{P_1\Phi}, \overline{P_1P_i})$$

The surface facet definition 22 of this embodiment may identify a point $P_2$ at which the angle $\Theta$ is a maximum as the second vertex of the first triangle, as shown in operation 82 of FIG. 10. This point $P_2$ is also guaranteed to be on the surface of the load envelope as shown in FIG. 11 in which the load cases and the points representative of the center $\Phi$ and the first and second vertices $P_1$, $P_2$ are shown in two-dimensions for purposes of illustration. As noted in FIG. 11 in which the angle $\Theta$ associated with point $P_2$ is at a maximum, the angle $\Theta$ cannot exceed 90° since the first vertex $P_1$ is the furthest point from the center $\Phi$.

The surface facet definition module 22 may also be configured to identify the third vertex of the first triangle so as to complete the definition of the first triangle. See operation 84 of FIG. 10. In this regard, the surface facet definition module 22 may be configured to identify a point for which a line extending through the point and perpendicular to a line between the first and second vertices $P_1$, $P_2$ defines the smallest angle $\Theta$ relative to a line parallel to a line extending through the center $\Phi$ and perpendicular to the line between the first and second vertices as the third vertex of the first triangle. In addition to the function PPP that was introduced previously, another function LPP (Line Projection Point) may be defined in order to illustrate one manner in which the third vertex of the first triangle may be identified. In this regard, the function LPP identifies a point on a line AB that has a minimum distance to a point P. With reference to FIG. 12, for example, $O_i$, $O_j$ and W may be defined, as well as unit vectors $\overline{\alpha}$, $\overline{\beta}$ and $\overline{\kappa}$, as follows:

$$O_i = LPP(P_1, P_2, P_i) \overline{\alpha} = Unit(\overline{O_i P_i})$$

$$O_j = LPP(P_1, P_2, P_j) \overline{\beta} = Unit(\overline{O_j P_j})$$

$$W = LPP(P_1, P_2, Q) \overline{\kappa} = Unit(\overline{WQ})$$

Additionally, the angle between $\overline{\alpha}$ and $\overline{\beta}$ can be expressed with arc-cosine in units of radians as follows:

$$\theta_i = ArcCos(\overline{\alpha} \cdot \overline{\kappa})$$

$$\theta_j = ArcCos(\overline{\beta} \cdot \overline{\kappa})$$

In the foregoing expressions, neither $O_i$ nor $O_j$ can exceed 90°. Although $O_i$ and $O_j$ are introduced for purposes of explanation relative to FIG. 12, the surface facet definition module 22 of one embodiment is not limited to the consideration of points $O_i$ and $O_j$, but considers all of the remaining points within the data set in an effort to identify the third vertex of the first triangle. In this regard, the surface facet definition module 22 of one embodiment may be configured to identify the point at which the angle $\Theta$ is the maximum. This point at which the angle $\Theta$ is a maximum may be designated $P_3$ and is guaranteed to be on the surface of the resulting load envelope. As such, point $P_3$ may be the third vertex which serves to define the first triangle.

The surface facet definition module 22 of one embodiment is also configured to define a second triangle including one side of the first triangle, as shown in operation 86 of FIG. 10. In one embodiment illustrated in FIG. 13 in which the first triangle was defined having vertices that may be identified as $P_1$, $P_2$ and $P_3$, the three sides of the first triangle are three gateways from which a search for a second triangle may be performed. In the following example, side 2-3 of the first triangle will be the window of the gateway for the search for the next critical point that will define, along with points $P_2$ and $P_3$, the three vertices of the second triangle. The surface facet definition module 22 may be configured to define the second triangle in various manners, but in one embodiment shown in FIG. 13, each of the points $P_i$ may be considered with $O_i$ being the projection of the point $P_i$ on side 2-3 and $O_1$ being the projection of point $P_1$ on side 2-3. In this regard, $O_1$ and $O_i$ as well as unit vectors $\overline{\chi}$ and $\overline{\alpha}$ are unit vectors which may be defined as follows:

$$O_1 = LPP(P_1, P_2, P_1) \overline{\chi} = Unit(\overline{O_1 P_1})$$

$$O_i = LPP(P_1, P_2, P_i) \overline{\alpha} = Unit(\overline{O_i P_i})$$

For the point $P_i$, the angle between the unit vector $\overline{\chi}$ and $\overline{\alpha}$ may be represented as follows:

$$\theta_i = Angle(\overline{\chi}, \overline{\alpha})$$

The surface facet definition module 22 of this embodiment may identify a point $P_N$ at which the angle $\theta$ is a minimum. This point $P_N$ is guaranteed to be on the surface of the load envelope and the angle $\theta$ has a value between 0° and 180°. As such, the surface facet definition module 22 of this embodiment may therefore define the second triangle to have the vertices 2, 3 and $P_N$ as shown in FIG. 14.

As shown in operation 86 of FIG. 10, the surface facet definition module 22 may also be configured to repeatedly define additional triangles until a plurality of triangles have been defined that include each of the critical load cases on the surface of the load envelope and that collectively define a closed form of the load envelope. Each additional triangle defined by the surface facet definition module 22 includes at least one side of the preceding triangle, such as in the manner described above in conjunction with the definition of the second triangle. The manner in which each additional triangle is defined by the surface facet definition module 22 may be performed in the same manner as described above in conjunction with the definition of the second triangle, albeit working from one side of the preceding triangle, as opposed to one side of the first triangle in each instance.

During the definition of each additional triangle, the surface facet definition module 22 may be configured to recall the sides that have previously been defined to be sides of other triangles. For example, in the construction of the third triangle from the second triangle having vertices 2, 3 and $P_N$ as shown in FIG. 14, the second triangle includes three sides, each of which may be considered as a window for the generation of a third triangle. However, side 2-3 of the second triangle is also a side of the first triangle and, as such, cannot also be a side of the third triangle. Thus, the surface face definition module 22 of one embodiment may only consider side 2-$P_N$ and side 3-$P_N$ as windows for the definition of a third triangle.

Regardless of which side of the second triangle is utilized as a common side with the third triangle, one of the sides of the second triangle is not used in the definition of a third triangle. As such, the surface face definition module 22 may store a definition of the unused side, such as side 2-$P_N$ of the second triangle, in the memory device, such as in a memory stack, and may return to side 2-$P_N$ at a subsequent point in the process in order to define an additional triangle. Indeed, as the surface facet definition module 22 defines each additional triangle, each side of the preceding triangle that was not used during the definition of the additional triangle and was not common with a preceding triangle is stored in memory, such as by being added to the memory stack.

The surface facet definition module 22 may be configured to continue to define additional triangles in the manner described above until the surface facet definition module can no longer identify a critical point on the surface of the load envelope, such as in an instance in which the surface facet definition module has formed a triangle that is enclosed by other, previously defined triangles. In this instance, the surface facet definition module 22 may operate in a recursive manner so as to identify one of the sides stored in the memory device, such as the side at the top of the memory stack, and to then utilize the previously stored side to identify an additional triangle. The surface facet definition module 22 may operate in this recursive manner until each of the sides stored in memory have been utilized in order to define additional surface triangles, at which point the entire load envelope will have been defined.

FIGS. 1, 2, 4, 6 and 10 illustrate block diagrams of example systems, methods and/or computer program products according to example embodiments. It will be understood that each module or block of the block diagrams, and/or combinations of modules or blocks in the block diagrams, can be implemented by various means. Means for implementing the modules or blocks of the block diagrams, combinations of the modules or blocks in the block diagrams, or other functionality of example embodiments described herein may include hardware, and/or a computer program product including a non-transitory computer-readable storage medium (as opposed to a computer-readable transmission medium which describes a propagating signal) having one or more computer program code instructions, program instructions or executable computer-readable program code instructions stored therein.

In this regard, program code instructions for carrying out the operations and functions of the modules of FIG. 1 and the blocks of FIGS. 2, 4, 6 and 10 and otherwise described herein may be stored in the memory device of an example apparatus, and executed by a processor. As will be appreciated, any such program code instructions may be loaded onto a computer or other programmable apparatus (e.g., processor, memory device or the like) from a computer-readable storage medium to produce a particular machine, such that the particular machine becomes a means for implementing the functions specified in the block diagrams' modules and blocks.

These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the block diagrams' modules or blocks.

The program code instructions may be retrieved from a computer-readable storage medium and loaded into a computer, processor or other programmable apparatus to configure the computer, processor or other programmable apparatus to execute operations to be performed on or by the computer, processor or other programmable apparatus. Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded and/or executed together. Execution of the program code instructions may produce a computer-implemented process such that the instructions executed by the computer, processor or other programmable apparatus provide operations for implementing the functions specified in the block diagrams' modules or blocks.

Accordingly, execution of instructions associated with the operations of the modules or blocks of the block diagrams by a processor, or storage of instructions associated with the modules or blocks of the block diagrams in a computer-readable storage medium, supports combinations of operations for performing the specified functions. It will also be understood that one or more modules or blocks of the block diagrams, and combinations of modules or blocks in the block diagrams, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A system for defining a load envelope that envelopes a plurality of load cases, the system comprising:
    a coordinate system redefinition module configured to define first, second and third mutually orthogonal axes in a space representative of at least first, second and third different types of load components, respectively, of the plurality of load cases; and
    a surface facet definition module configured to identify load cases on a surface of the load envelope and to define a plurality of surface facets that collectively define the load envelope, wherein each surface facet includes a plurality of vertices comprised of load cases identified to be on the surface of the load envelope, and
    wherein the system is configured to analyze a response of a structure to the load cases identified to be on the surface of the load envelope to permit the structure to be designed to accommodate the load cases.

2. A system according to claim 1 further comprising a point elimination module configured to:
    identify one or more load cases within an interior of the load envelope; and
    eliminate the one or more load cases within the interior of the load envelope from consideration prior to identifying load cases on the surface of the load envelope and defining the plurality of surface facets.

3. A system according to claim 1 further comprising a normalization module configured to separately normalize data representative of the load components prior to identifying load cases on the surface of the load envelope and defining the plurality of surface facets.

4. A system according to claim 1 wherein each load case defines a point in the space, and wherein the coordinate system redefinition module is further configured to define the three mutually orthogonal axes by:
    identifying maximum and minimum values of the points in each of x, y and z directions;
    identifying the points having the maximum and minimum values that are separated by a greatest distance;
    establishing a first axis extending between points having the maximum and minimum values that are separated by the greatest distance;
    identifying a point that is separated from the first axis by a greatest distance as measured along a line extending through the point and perpendicular to the first axis;
    establishing a second axis along the line extending through the point that is identified as being separated from the first axis by the greatest distance; and
    establishing a third axis based upon a cross product of the first and second axes.

5. A system according to claim 4 wherein the surface facet definition module is further configured to define the plurality of surface facets by defining a plurality of surface triangles that collectively define the load envelope.

6. A system according to claim 5 wherein the surface facet definition module is further configured to define the plurality of surface triangles by:
   identifying a point that is furthest from a center of maximum and minimum values in each of the first, second and third axes as a first vertex of a first triangle;
   identifying a point for which a vector between the first vertex and the point defines a largest angle relative to a vector between the center and the first vertex as a second vertex of the first triangle;
   identifying a point for which a line extending through the point and perpendicular to a line between the first and second vertices defines a smallest angle relative to a line parallel to a line extending through the center and perpendicular to the line between the first and second vertices as a third vertex of the first triangle; and
   defining a second triangle including one side of the first triangle.

7. A system according to claim 6 wherein the surface facet definition module is further configured to repeatedly define additional triangles including one side of a preceding triangle.

8. A method of defining a load envelope that envelopes a plurality of load cases, the method comprising:
   defining first, second and third mutually orthogonal axes in a space representative of at least first, second and third different types of load components, respectively, of the plurality of load cases;
   identifying load cases on a surface of the load envelope;
   defining, with a processor, a plurality of surface facets that collectively define the load envelope, wherein each surface facet includes a plurality of vertices comprised of load cases identified to be on the surface of the load envelope; and
   analyzing a response of a structure to the load cases identified to be on the surface of the load envelope to permit the structure to be designed to accommodate the load cases.

9. A method according to claim 8 further comprising:
   identifying one or more load cases within an interior of the load envelope; and
   eliminating the one or more load cases within the interior of the load envelope from consideration prior to identifying load cases on the surface of the load envelope and defining the plurality of surface facets.

10. A method according to claim 8 further comprising separately normalizing data representative of the load components prior to identifying load cases on the surface of the load envelope and defining the plurality of surface facets.

11. A method according to claim 8 wherein each load case defines a point in the space, and wherein defining the three mutually orthogonal axes comprises:
   identifying maximum and minimum values of the points in each of x, y and z directions;
   identifying the points having the maximum and minimum values that are separated by a greatest distance;
   establishing a first axis extending between points having the maximum and minimum values that are separated by the greatest distance;
   identifying a point that is separated from the first axis by a greatest distance as measured along a line extending through the point and perpendicular to the first axis;
   establishing a second axis along the line extending through the point that is identified as being separated from the first axis by the greatest distance; and
   establishing a third axis based upon a cross product of the first and second axes.

12. A method according to claim 11 wherein defining the plurality of surface facets comprises defining a plurality of surface triangles that collectively define the load envelope.

13. A method according to claim 12 wherein defining the plurality of surface triangles comprises:
   identifying a point that is furthest from a center of maximum and minimum values in each of the first, second and third axes as a first vertex of a first triangle;
   identifying a point for which a vector between the first vertex and the point defines a largest angle relative to a vector between the center and the first vertex as a second vertex of the first triangle;
   identifying a point for which a line extending through the point and perpendicular to a line between the first and second vertices defines a smallest angle relative to a line parallel to a line extending through the center and perpendicular to the line between the first and second vertices as a third vertex of the first triangle; and
   defining a second triangle including one side of the first triangle.

14. A method according to claim 13 further comprising repeatedly defining additional triangles including one side of a preceding triangle.

15. A non-transitory computer-readable storage medium for defining a load envelope that envelopes a plurality of load cases, the computer-readable storage medium having computer-readable program code portions stored therein that in response to execution by a processor cause an apparatus to:
   define first, second and third mutually orthogonal axes in a space representative of at least first, second and third different types of load components, respectively, of the plurality of load cases;
   identify load cases on a surface of the load envelope;
   define a plurality of surface facets that collectively define the load envelope, wherein each surface facet includes a plurality of vertices comprised of load cases identified to be on the surface of the load envelope; and
   analyzing a response of a structure to the load cases identified to be on the surface of the load envelope to permit the structure to be designed to accommodate the load cases.

16. The non-transitory computer-readable storage medium according to claim 15 wherein the computer-readable program code portions are further configured, in response to execution by the processor, to cause the apparatus to:
   identify one or more load cases within an interior of the load envelope; and
   eliminate the one or more load cases within the interior of the load envelope from consideration prior to identifying load cases on the surface of the load envelope and defining the plurality of surface facets.

17. The non-transitory computer-readable storage medium according to claim 15 wherein the computer-readable program code portions are further configured, in response to execution by the processor, to cause the apparatus to separately normalize data representative of the load components prior to identifying load cases on the surface of the load envelope and defining the plurality of surface facets.

18. The non-transitory computer-readable storage medium according to claim 15 wherein each load case defines a point in the space, and wherein the computer-readable program code portions are configured, in response to execution by the processor, to cause the apparatus to define the three mutually orthogonal axes by:

identifying maximum and minimum values of the points in each of x, y and z directions;

identifying the points having the maximum and minimum values that are separated by a greatest distance;

establishing a first axis extending between points having the maximum and minimum values that are separated by the greatest distance;

identifying a point that is separated from the first axis by a greatest distance as measured along a line extending through the point and perpendicular to the first axis;

establishing a second axis along the line extending through the point that is identified as being separated from the first axis by the greatest distance; and establishing a third axis based upon a cross product of the first and second axes.

19. The non-transitory computer-readable storage medium according to claim 18 wherein the computer-readable program code portions are configured, in response to execution by the processor, to cause the apparatus to define the plurality of surface facets by defining a plurality of surface triangles that collectively define the load envelope.

20. The non-transitory computer-readable storage medium according to claim 19 wherein the computer-readable program code portions are configured, in response to execution by the processor, to cause the apparatus to define the plurality of surface triangles by:

identifying a point that is furthest from a center of maximum and minimum values in each of the first, second and third axes as a first vertex of a first triangle;

identifying a point for which a vector between the first vertex and the point defines a largest angle relative to a vector between the center and the first vertex as a second vertex of the first triangle;

identifying a point for which a line extending through the point and perpendicular to a line between the first and second vertices defines a smallest angle relative to a line parallel to a line extending through the center and perpendicular to the line between the first and second vertices as a third vertex of the first triangle; and defining a second triangle including one side of the first triangle.

* * * * *